(12) United States Patent
Aryafar et al.

(10) Patent No.: US 9,491,776 B2
(45) Date of Patent: Nov. 8, 2016

(54) SYSTEMS AND METHODS FOR SCHEDULING COMMUNICATION BETWEEN WIRELESS DEVICES TO REDUCE INTERFERENCE ASSOCIATED WITH FULL DUPLEX COMMUNICATION IN MULTI-CELL NETWORKS

(71) Applicants: Ehsan Aryafar, Kensington, CA (US);
Roya Doostnejad, Los Altos, CA (US);
Shilpa Talwar, Los Altos, CA (US)

(72) Inventors: Ehsan Aryafar, Kensington, CA (US);
Roya Doostnejad, Los Altos, CA (US);
Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 14/498,526

(22) Filed: Sep. 26, 2014

(65) Prior Publication Data
US 2016/0029404 A1    Jan. 28, 2016

Related U.S. Application Data

(60) Provisional application No. 62/028,166, filed on Jul. 23, 2014.

(51) Int. Cl.
*H04W 72/12* (2009.01)
*H04L 5/14* (2006.01)
(Continued)

(52) U.S. Cl.
CPC ........ *H04W 72/1231* (2013.01); *H04L 5/0073* (2013.01); *H04L 5/14* (2013.01); *H04W 72/046* (2013.01)

(58) Field of Classification Search
CPC ........................... H04W 72/1231; H04L 5/14
See application file for complete search history.

(56) References Cited

U.S. PATENT DOCUMENTS

| 6,016,421 A  * | 1/2000 | Weiss ................... H04W 68/00 137/601.01 |
| 7,136,624 B2 * | 11/2006 | Ofuji .................... H01Q 1/1257 370/902 |

(Continued)

FOREIGN PATENT DOCUMENTS

| CN | 103596233 A | 2/2014 |
| WO | 2013024942 | 2/2013 |

OTHER PUBLICATIONS

International Search Report and Written Opinion for International Application No. PCT/US2015/037076 mailed Sep. 30, 2015.

(Continued)

*Primary Examiner* — Rasheed Gidado
(74) *Attorney, Agent, or Firm* — Sutherland Asbill & Brennan LLP

(57) ABSTRACT

Certain embodiments herein relate to scheduling interference between wireless devices in a manner that reduced interference associated with full duplex communication. Signal strength and interference information associated with communication between wireless devices may be collected and forwarded to a processing device, such as a central controller. The central controller may utilize such information to generate a conflict graph that depicts interference relationships between the wireless devices. Using the conflict graph, the central controller may determine whether requested communications may be scheduled along with concurrently scheduled communications without resulting in interference affecting the communications. In one embodiment, a requested communication may be scheduled with other concurrently scheduled communications if the aggregated throughput is increased with the addition of the requested communication.

22 Claims, 6 Drawing Sheets

(51) Int. Cl.
 *H04L 5/00* (2006.01)
 *H04W 72/04* (2009.01)

(56) References Cited

U.S. PATENT DOCUMENTS

| | | | | |
|---|---|---|---|---|
| 7,990,942 B2* | 8/2011 | Taira | ............... | H04B 7/2643 |
| | | | | 370/326 |
| 2005/0181832 A1* | 8/2005 | Ishii | ............... | H04W 36/06 |
| | | | | 455/562.1 |
| 2006/0268760 A1* | 11/2006 | Fang | ............... | H04W 74/0816 |
| | | | | 370/328 |
| 2009/0318088 A1 | 12/2009 | Wu et al. | | |
| 2011/0183623 A1* | 7/2011 | Yang | ............... | H04B 7/0408 |
| | | | | 455/63.1 |
| 2011/0211490 A1 | 9/2011 | Nikula et al. | | |
| 2011/0243040 A1* | 10/2011 | Khan | ............... | H04B 7/0617 |
| | | | | 370/280 |
| 2013/0143583 A1* | 6/2013 | Son | ............... | H04W 72/0406 |
| | | | | 455/452.2 |
| 2014/0198681 A1* | 7/2014 | Jung | ............... | H04B 17/318 |
| | | | | 370/252 |

OTHER PUBLICATIONS

Choi, Yang-Seok, "Simultaneous Transmission and Reception: Algorithm, Design and System Level Performance", IEEE Transactions on Wireless Communications, vol. 12, Issue: 12, Oct. 28, 2013, pp. 5992-6010, 2 pages of Abstract only.

Liu et al., "DIRC: Increasing Indoor Wireless Capacity Using Directional Antennas", SIGCOMM'09, Aug. 17-21, 2009, 12 pages.

Liu et al., "Pushing the Envelope of Indoor Wireless Spatial Reuse using Directional Access Points and Clients", MobiCom'10, Sep. 20-24, 2010, 12 pages.

Navda et al., "MobiSteer: Using Steerable Beam Directional Antenna for Vehicular Network Access", MobiSys'07, Jun. 11-14, 2007, 14 pages.

Sani et al., "Directional Antenna Diversity for Mobile Devices: Characterizations and Solutions", MobiCom'10, Sep. 20-24, 2010, 12 pages.

Yu et al., "Beamforming on Mobile Devices: A First Study", MobiCom'11, Sep. 19-23, 2011, 12 pages.

Office Action from Taiwanese Application No. 104118503 dated Aug. 19, 2016 (7 pgs, including 1pg English translation).

\* cited by examiner

SYSTEMS AND METHODS FOR SCHEDULING COMMUNICATION BETWEEN WIRELESS DEVICES TO REDUCE INTERFERENCE ASSOCIATED WITH FULL DUPLEX COMMUNICATION IN MULTI-CELL NETWORKS

RELATED APPLICATIONS

The present application is a non-provisional application claiming priority to U.S. Provisional Application No. 62/028,166, entitled "Systems and Methods for Reducing Interference in Full Duplex Multi-Cell Networks," filed Jul. 23, 2014, and is hereby incorporated by reference in its entirety as if fully set forth herein.

BACKGROUND

Full duplex communication enables wireless devices to simultaneously send and receive information on the same frequency. As a result, throughput or capacity of wireless communications may be doubled or otherwise increased significantly. Such increases in throughput and capacity, among other benefits, may not be realized, however, due to interference that may accompany full duplex communication. As an example, communication between an access point and a client device may result in the access point projecting interference onto other, neighboring access points and client devices, and may also result in the client device projecting interference onto other, neighboring client devices and access points. Example types of interference may include cross-talk interference, co-channel interference, other full duplex induced interference, or generally interference that may be associated with devices that operate in a single-cell or a multi-cell wireless mode. Existing systems have struggled to avoid such interference when facilitating communication between wireless devices in multi-cell networks.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein relate to, among other things, scheduling interference between wireless devices to reduce interference associated with full duplex communication. Full duplex communication may enable wireless devices to send and receive information at the same time and on the same frequency, which may increase the throughput of wireless communications. Certain embodiments herein relate to reducing interference associated with such full duplex communication, among other things.

A central controller, which may control access points, may collect information about signal strengths and interference experienced by the access points, user devices associated with the access points, and neighboring user devices and access points. The central controller may utilize the signal strength and interference information to generate a conflict graph that depicts interference relationships between the devices. The central controller may utilize the conflict graph to schedule requested communications between devices such that the communications do not experience interference associated with full duplex communications. For example, the central controller may analyze each requested communication in view of concurrently scheduled communication requests to determine if scheduling a new communication request will result in interference for the scheduled wireless communications.

In one embodiment, if a capacity or throughput associated with the requested communication does not increase an aggregated throughput associated with all concurrently scheduled communication requests, then the communication request may not be scheduled. If the aggregated throughput is increased in such instances, then the communication request may be scheduled. The aggregated throughput may be based on the signal strengths and interferences collected by the central controller from various wireless devices as described above, and their depicted relationships between devices in the conflict graph.

Figure 1:
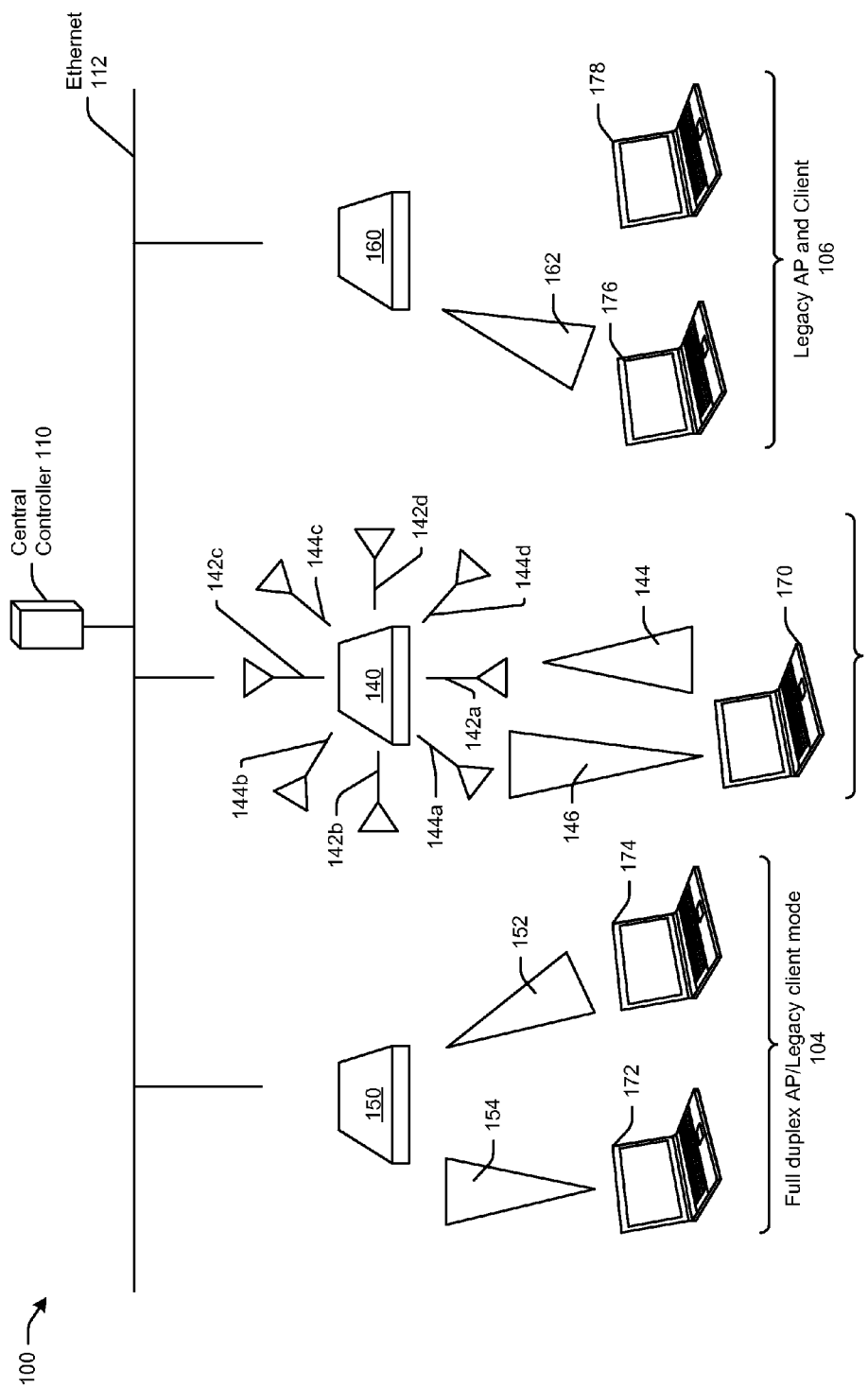
FIG. 1 illustrates an example multi-cell network in which communication between various types of devices may be scheduled, according to an embodiment of the disclosure.

FIG. 1 depicts an example multi-cell network 100 in which communication between various types of devices may be scheduled. Although a certain number of these devices are shown in FIG. 1, fewer or more of each type of device may exist in other examples. A central controller 110 may control the operations of one or more access points (APs), such as the access points 140, 150, and 160. In so doing, the central controller 110 may send messages that may cause the access points 140, 150, and 160 to send and receive information from user devices on the multi-cell network that may be used to schedule communication between the devices in a way that reduces the amount of interference experienced during communication, as will be described in greater detail below. Communication between the central controller 110 and the access points 160 may occur via an Ethernet backbone 112, in one configuration. Other types of wired or wireless communication between such devices may exist in other configurations.

As an example, the central controller 110 may send a message to the access points 140, 150, and 160 that may cause the access points to transmit frames in multiple directions to user devices. For example, the access point 140 may transmit a burst of frames in directions associated with each of its one or more transmit antennas 142*a-d*. All or at least a portion of the transmitted frames may be received by one or more user devices, such as the user device 170, which may send a response message to the access point 140. The access point 140, via one or more of its receive antennas 144*a-d*, may receive the message from the user device 140. As will be described in greater detail below, certain antennas or beams may be selected such that communication between the access point 140 and the user device 170 occurs with a reduced amount of interference. Such a reduction in interference may be realized as an increase (e.g., doubled) throughput of communications in the multi-cell network 100, in one embodiment.

The example antenna configuration of transmit antennas 142*a-d* and receive antennas 144*a-d* may be used to reduce interference in full duplex multi-cell networks. As shown, eight (8) directional patch antennas (e.g., four (4) transmit antennas 142*a-d* and four (4) receive antennas 144*a-d*) may cover the entire Azimuth of 360 degrees, where each antenna is associated with a projected coverage area. In some embodiments, software steerable directional antennas with relatively small reconfiguration times, such as phased array antennas, may be used instead of, or in addition to, multiple patch antennas to realize directional transmission and/or reception pattern. Appropriate selection of the transmission antennas 142*a-d* and receive antennas 144*a-d* may enable a reduction in the amount of interference that an access point projects on, or receives from, other access points and user devices.

In certain embodiments herein, the above directional antennas may be coupled to an access point. A directional antenna may provide interference reduction by spatially confining transmissions. As an example, directional antennas may provide spatial isolation of up to 20 dB by confining the signal within a sector of ten (10) degrees, or put another way, the signal outside of the sector is at least 20 dB weaker than the signal within the sector. Such spatial isolation may be leveraged by full duplex access points to reduce interference if the orientation of the antenna is selected properly.

The antenna orientation and user device selection may depend on the correct interference estimation. In one embodiment, a measurement technique may include measuring the signal strength observed by user devices as a function of access points and selected beams. The measurement technique may also include measuring the interference levels between different user devices. In so doing, received signal strength indicators (RSSIs) may be received and analyzed.

The example communication between the access point 140 and the user device 170 above may utilize full duplex mode 102, in which both the access point 140 and the user device 170 may be configured for full duplex communication. In such a configuration, the access point 140 may send a message 144 to the user device 170, and simultaneously (or near simultaneously) and on the same frequency, receive a message 146 from the user device 170. The user device 170 may also simultaneously receive and send such messages, respectively, to the access point 170.

Certain embodiments herein may also relate to communication between an access point configured for full duplex communication and a user device configured for half duplex communication, as shown in configuration full duplex AP/legacy client mode 104. According to this configuration, the access point 150 may send a message 152 to the user device 174, and may simultaneously receive a message from the user device 172, as a non-limiting example. The user devices 172 and 174, however, may either communicate in one direction at a time (e.g., either send or receive a message at a particular time). In this way, the legacy client mode 104 may refer to user devices 172 and 174 that operate in half duplex communication mode. Types of communication other than full duplex communication may exist in the mode 104.

Certain embodiments herein may further relate to communication between access points and user devices configured for legacy (e.g., half duplex) communication. As shown in the legacy AP and client mode 106, an access point 160 may send a message 162 to the user device 176, but may not simultaneously send or receive another message to the user device 178.

The above descriptions and configurations in FIG. 1 are for purposes of illustration and are not meant to be limiting. Other descriptions, configurations, etc., may also exist. For example, any number of directional antennas or beams may be associated with the access points 140. Also, while only access point 140 is shown with multiple transmit and receive antennas, the access points 150 and 160 may also include the same or a similar configuration of antennas.

Figure 2:
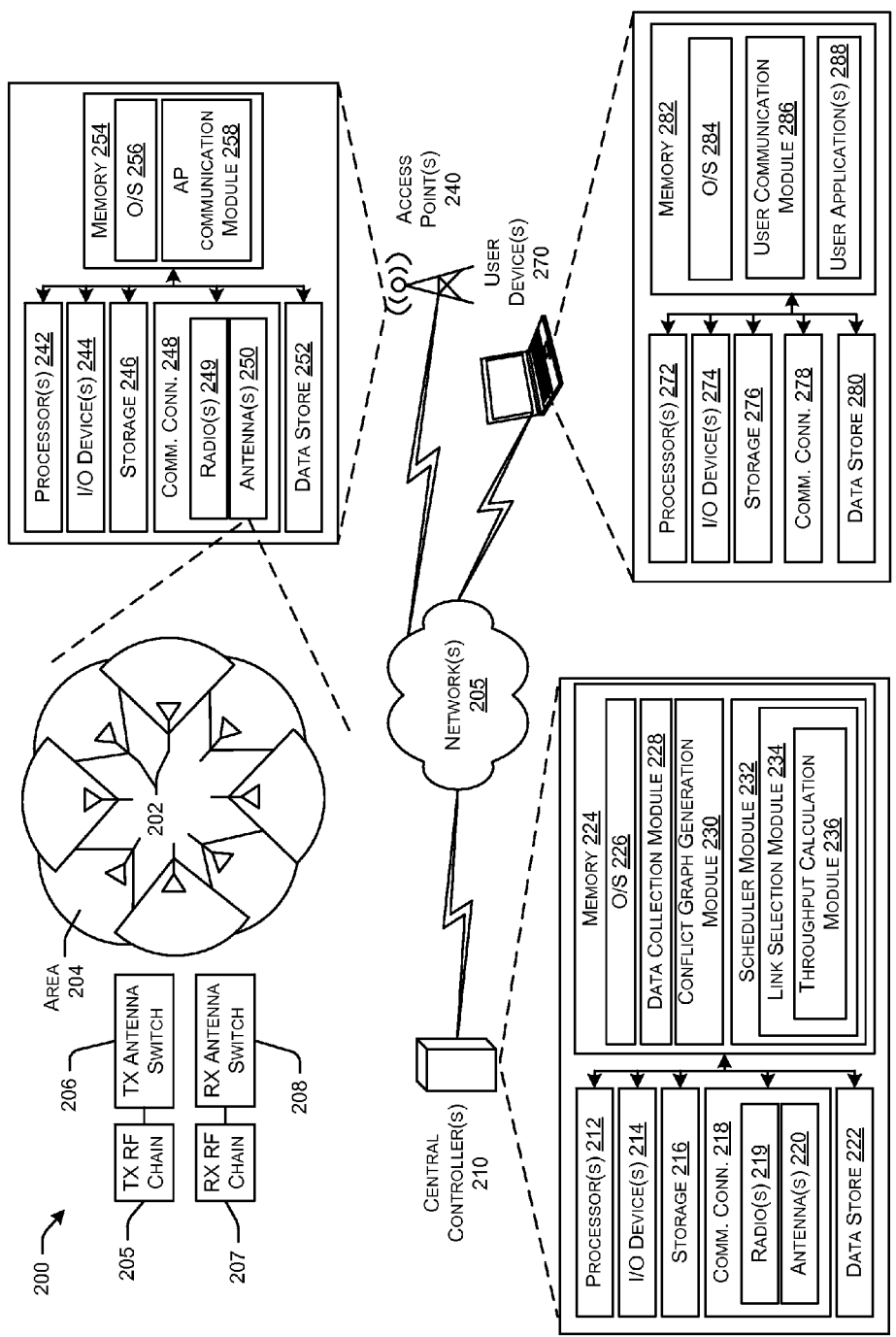
FIG. 2 illustrates an example computing environment for scheduling communication between wireless devices to reduce interference, according to an embodiment of the disclosure.

FIG. 2 depicts an example computing environment 200 for scheduling communication between wireless devices to reduce interference, according to an embodiment of the disclosure. As described above, a central controller 210 may communicate with one or more access points 240, which may communicate with one or more client or user devices 270. Such communication may occur over one or more networks 205. According to one embodiment, the central controller 210 may instruct an access point 270 to collect information associated with signal strengths and interference detected by a user device 270. The access point 270 may in turn transmit a burst of frames in multiple directions (e.g., using directional antennas) to the user device 270, which may determine a signal strength associated with each direction (or beam) associated with the received frames. The user device 270 may send such information, along with interference detected from neighboring user devices, to the access point 240. The access point 240 may forward the information received form the user device 270, along with information associated with interference detected from neighboring access points, to the central controller 210 for processing as described herein.

As used herein, the term "device" may refer to any computing component that includes one or more processors that can be configured to execute computer-readable, computer-implemented, or computer-executable instructions. Example devices may include personal computers, server computers, server farms, digital assistants, smart phones, personal digital assistants, digital tablets, smart cards, wearable computing devices, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate the processes described herein.

As mentioned, the devices in FIG. 2 may include a radio receiver. A physical layer interface in the radio receiver may include a radio frequency (RF) unit that may be configured to provide for reception of one or more RF signals at one or more frequencies. According to one configuration, the RF unit may include an amplifier, a mixer, a local oscillator, and so forth. The RF unit may be implemented as discrete electronic components, integrated circuits, software-defined radio, or a combination thereof, according to various configurations. The devices in FIG. 2 may further include a radio transmitter that may send one or more RF signals to one or more access points. In some configurations, the devices in FIG. 2 may include a radio transceiver that may receive and send RF signals. The transceiver (or the receiver and/or the transmitter) may be coupled to one or more antennas.

A wireless network herein, such as that which may be used to enable communication between the devices in FIG. 2, may utilize various frequencies to enable such communication. For example, some wireless networks may utilize a frequency of 2.4 GHz for communicating as defined by the Institute of Electrical and Electronics Engineers (IEEE) 802.11 b, and g specification. Other wireless networks may utilize a frequency of 5 GHz for communicating as defined by the IEEE 802.11a specification. IEEE 802.11 a and b were published in 1999, and IEEE 802.11g was published in 2003. Devices that comply with the IEEE 802.11 b standard may commonly be referred to or marketed as wireless fidelity (Wi-Fi) compatible devices. Some wireless networks may operate in millimeter wave frequencies (e.g., 60 GHz band).

The one or more networks 205 may include any number of wireless or wired networks that may enable communication between the devices. Example networks may include, but are not limited to, WiFi networks, WiFi Direct networks, NFC networks, Bluetooth® networks, cellular networks, multi-cell networks, radio networks, satellite networks, other short-range, mid-range, or long-range wireless networks, the Internet, intranets, cable networks, landline-based networks, Ethernet networks, or other communication mediums connecting multiple computing devices to one another.

The devices in FIG. 2 may implement various wireless communications protocols, such as WiFi, WiFi Direct, etc. The communications protocols may also include various modulation techniques for modulating signals. Such signals may include information in frames distributed over the one or more networks 205, such as Orthogonal Frequency Division Multiplexing (OFDM), dense wave division multiplexing (DWDM), phase-shift keying (PSK), frequency-shift keying (FSK), amplitude-shift keying (ASK), and quadrature amplitude modulation (QAM), single carrier (SC) modulation among other techniques. Each of the devices shown in FIG. 2 may utilize such modulation techniques (e.g., via a modulator), as well as demodulation techniques (e.g., via a demodulator) to access information from a modulated signal.

The devices in FIG. 2 may include one or more processors configured to communicate with one or more memory devices and various other components or devices. For example, the central controller 210 may include one or more processors 212, one or more input/output (I/O) devices 214, storage 216, one or more communication connections 218, and one or more data stores 222. The one or more processors 212 may be implemented as appropriate in hardware, software, firmware, or a combination thereof. The one or more processors 242 and 272 associated with the access point 240 and the user device 270, respectively, may be the same or similar to the one or more processors 212.

The memory 224 of the central controller 210 may store program instructions that are loadable and executable on the processor 212, as well as data generated during the execution of these programs. Depending on the configuration and type of the central controller 210, the memory 224 may be volatile, such as random access memory (RAM), static random access memory (SRAM), dynamic random access memory (DRAM); or non-volatile, such as read-only memory (ROM), Electrically Erasable Programmable Read-Only Memory (EEPROM), flash memory, etc. The memories 254 and 282 associated with the access point 240 and the user device 270, respectively, may be the same or at least similar to the memory 224.

The storage 216 of the central controller 210 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing system. The storage 246 and 276 associated with the access point 240 and the user device 270, respectively, may be the same or at least similar to the storage 216.

The memories 224, 254, and 282, and the storage 216, 246, and 276, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The I/O devices 214 of the central controller 210 may enable a user to interact with the central controller 210 to perform various functions. The I/O devices 214 may include, but are not limited to, a keyboard, a mouse, a pen, a voice input device, a touch input device, a gesture detection or capture device, a display, a camera or an imaging device, speakers, and/or a printer. The I/O devices 244 and 274 associated with the access point 240 and the user device 270, respectively, may be the same or at least similar to the I/O devices 214.

The communication connections 218 of the central controller 210 may allow the user central controller 210 to communicate with other devices, such as access points 140 and user devices 270, over the one or more networks 205. The communication connections 118 may include one or more antennas 120 and one or more radios 119, which may include hardware and software for sending and/or receiving wireless signals over the various types of networks described above. The access point 240 and the user device 270 may also include one or more antennas and radios.

The access point 240 may include multiple transmit and receive antennas, each of which may be used to communicate with a user device in a manner that reduces the amount of interference (and increases throughput) during the communication. A transmit (TX) radio frequency (RF) chain 205 may be connected to a separate directional transmit antenna switch 206, and receive (RX) RF chain 207 may be connected to a separate directional receive (RX) antenna switch 208, as shown. Multiple antennas 202, which may embody the antennas 142a-d and 144a-d shown in FIG. 1, may be used to send and receive communications over the area 204, in one embodiment.

The one or more data stores 222 may store lists, arrays, databases, flat files, etc. In some implementations, a data store 222 may be stored in a memory external to the central controller 210 but may be accessible via one or more networks, such as with a cloud storage service. The data store 222 may store information that may facilitate the processes described herein. Example stored information may include, but is not limited to, information that uniquely identifies access points 240 with which the central controller 210 may communicate, such as a Media Access Control (MAC) address for such devices; signal strengths (e.g., Received Signal Strength Indicator (RSSI) measurements, and interference detected by the access points 240 and the user devices 270; and scheduling information that may control when access points 240 and user devices 270 transmit information over the network 205, as well as control which directions or beams used by the access points 240 when communicating with the user devices 270. The data stores 252 and 280 associated with the access point 240 and the user device 270, respectively, may also store information to facilitate the processes described herein.

Turning now to the contents of the memory 224, the memory 224 may include, but is not limited to, an operating system (O/S) 226, a data collection module 228, a conflict graph generation module 230, and a scheduler module 232. Each of these modules may be implemented as individual modules that provide specific functionality associated with the processes described herein. Alternatively, one or more of the modules may perform all or at least some of the functionality associated with the other modules.

The operating system 226 may refer to a collection of software that manages computer hardware resources and provides common services for computer programs to enable and facilitate the operation of such programs. Example operating systems may include UNIX, Microsoft Windows, Apple OS X, etc. The operating systems 256 and 284 associated with the access point 240 and the user device 270, respectively, may be the same or similar to the operating system 226.

The data collection module 228 may perform functions associated with obtaining RSSI measurements and interference data associated with other devices, such as the access point 240 and the user device 270. One such function may include sending a message to the access point 240 that may cause the access point 240 scan each of its transmit directions and transmit a burst of frames in all or at least a portion of these directions. Each such direction may also be referred to herein as a beam. In one embodiment, the message may include an instruction that, when executed by the access point (e.g., the processor 242), may cause the transmission of the burst of frames and scanning by the access point 240. As shown in FIG. 2, the access point 270 may include multiple transmit and receive antennas 250 (such as the transmit antennas 142a-d and the receive antennas 144a-d in FIG. 1). The instruction received from the data collection module 228 may indicate one or more of the transmit antennas 250 that the access point should use for sending the burst of frames. The message received from the data collection module 228 may also include a time at which the access point 240 may transmit the burst of frames, as described in greater detail below.

User devices 270 that receive the burst of frames may determine an RSSI associated with each direction in which the frames were received. Such directions may also be referred to herein as beams such that each direction has a corresponding beam or antenna associated with it. Each beam received by the user device 270 may have a different RSSI measurement. In addition, or as an alternative, to determining RSSI measurements associated with each direction in which frames are received, the user device 270 may also measure interference from neighboring user devices 270. For example, when a user device 270 is not communicating with another device such as the access point 270, the user device 270 may receive interference from neighboring user devices 270 during their transmission with other devices. Similarly, neighboring access points may listen to the transmission from the access point 240 to the user device 270, and may scan each of its receive beams and determine any interference associated with the neighboring transmission.

The RSSI measurements and interference detected by the user device 270 may be forwarded to the access point 270 with which the user device 270 is associated. The data collection module 228 may in turn forward such information to the data collection module 228. The data collection module 228 may also receive and forward the interference information measured by the neighboring access points. Thus, another function performed by the data collection module 228 may include receiving RSSI measurement data and interference information from access points 240 and user devices 270. In this way, the data collection module 228 may receive RSSI and interference measurements associated with each beam or direction in which it may transmit, and utilize the information to determine an optimized beam or antenna to use when communicating with the user device 270. As will be described in greater detail below, such information may be utilized by the scheduler module 232 to schedule communications over the network 205 to reduce interference, or increase throughput, of active communications on the network 205.

The conflict graph generation module 230 may utilize the information received by the data collection module 228 to generate a conflict graph. In so doing, the conflict graph generation module 230 may depict relationships of interference between the access points 240 and the user devices 270, in one embodiment. The conflict graph may include one or more nodes and links connecting the nodes. The nodes may represent a communication link, such as a communication between access points 240 and user devices 270, and links may represent interference between different communication links. Each data transmission that is being considered may be analyzed in view of concurrently scheduled transmissions to determine any interference that may result from scheduling the transmission that is being considered. Such interference may be represented in the conflict graph as an edge that flows between a node associated with a scheduled transmission and a potentially active link (e.g., a transmission that is being considered), in one embodiment. Put another way, such interference may represent the projection of interference onto neighboring access points and/or user devices that may result from communication by access points 240 and user devices 270. Example network graphs depicting example networks may be used to generate conflict graphs such as those illustrated in FIGS. 3A and 3B.

By virtue of collecting measurement data by the data collection module 228 and representing such information by the conflict graph generation module 230, the level of interference that concurrently scheduled links may cause to each other (or to a potential active communication link) may be known. In this way, the conflict graph may enable the determination of potential interference before links are activated for communication. By analyzing each beam associated with an antenna of an access point 240 in view of the interference relationships represented by the conflict graph, a beam or antenna orientation that will result in the least amount of interference (e.g., when the access point 240 communicates with the user device 270) may be selected to optimally reduce the level of interference (and hence increase the throughput).

The scheduler module 232 may perform functions associated with scheduling communication between the devices on the network 205. For example, the scheduler module may coordinate receipt of information (e.g., by the data collection module 228) according to a schedule. The central controller 110 may also schedule concurrent transmissions to optimize network performance. Such scheduling may be performed within Time Division Multiple Access (TDMA) Medium Access Control (MAC), which may include creating slots for full duplex operation in addition to one-way transmission. As an example, the scheduler module 232 may allocate time slots for each access point 240 and user device 270 to control transmission of RSSI and interference measurements to the data collection module 228. The TDMA MAC protocol may be implemented by making modifications to the 802.11 standard operations, in one embodiment.

The scheduler module 232 may also send the schedule information to all or at least a portion of its associated access points 240, which may maintain schedule information pertaining to it and forward schedule information to their respective user devices 270. In this way, each of the devices on the network 205 may know when to communicate RSSI and interference measurement data.

The scheduler module 232 may also perform functions associated with scheduling communications (e.g., data communications) between access points 240 and user devices 270. The data communication may include the transmission of various content, such as video, audio, multimedia, text, data, or other information. In one embodiment, the scheduler module 232 may include a link selection module 234 and a throughput calculation module to implement or facilitate its scheduling of communications.

An example function performed by the scheduler module 232 may include receiving information associated requests for communication by access points 240 and user devices 270. An example request may include a download request in which an access point 240 requests to transmit information to a user device 240. Another example request may include an upload request in which a user device 270 requests to transmit information to an access point 240. Information associated with these transmission requests may include, but is not limited to, unique identifications of the transmitting and receiving device, a direction of the transmission requests (e.g., download or upload), and information identifying the data associated with the transmission (e.g., a name, size, type, etc., of the data or content).

A transmission request may correspond to a communication link, as described above. For example, a first link may represent a download transmission request from a first access point 240 to a first user device 270. A second link may represent an upload request from a second user device 270 to a second access point 240. A third link may represent a download request from the first access point 240 to a third user device 270, and so forth, such that communication links representing requested communication between any number of devices may exist. As will be described in greater detail herein, the scheduler module 232 may access such communication links according to an arrangement or order, and determine whether a particular beam associated with the links are suitable for implementing an associated transmission request. A suitable direction or beam may be one in which the amount of interference experienced during implementation of the transmission request is reduced, and/or one in which the throughput of the communication is increased, as non-limiting examples.

The scheduler module 232 may arrange transmission requests in a certain order, in one embodiment. Such ordering may include storing the transmission requests in one or more queues. For example, download requests may be stored in one or more download queues, while upload requests may be stored in one or more upload queues. Various others types and/or numbers of queues may exist in other examples such that transmission request information may be grouped according to similar or like criteria, features, etc. Other arrangement or ordering techniques may also exist.

To facilitate scheduling transmission requests, the scheduler module 232 may access each of the stored transmission requests and determine whether they should be scheduled (e.g., activated) along with one or more existing, concurrently scheduled transmission requests. In one embodiment, the stored transmission requests may be accessed in order, such as first-in first-out (FIFO), last-in first-out (LIFO), or according to various other ordering techniques. The scheduler module may first access all transmission requests in either of the download queue or the upload queue before moving to the other queue, or may alternate between the requests in such queues, in example embodiments herein. Any number of other accessing techniques may be implemented in other examples. Such accessing of transmission requests may be implemented by the link selection module 234, in one embodiment.

The link selection module 234 may also determine a set of scheduled transmissions and their selected beam directions for a next transmission time slot, as described above. Each stored transmission request and its beam directions may be evaluated for inclusion in the set of scheduled transmissions. Determining the set of scheduled transmissions may include analyzing whether a suitable beam exists for implementing a particular transmission request, as described above. Put another way, if a beam associated with a link increases capacity or throughput of the current communications, then the link may be scheduled for communication, in one example. If a beam associated with the link does not increase throughput, then the link may be skipped in the queue and the next link in queue may be analyzed to determine whether it has a beam that, if used for the transmission request, would increase throughput.

In one embodiment, the link selection module 234 may implement an algorithm to determine the set of scheduled transmissions that may reduce interference and/or increase throughput. In one configuration, the link selection module 234 may implement a second algorithm (e.g., via the throughput calculation module 236) that may calculate the throughput for each beam associated with a link. The link selection module 234 may use the results of the calculation to determine whether to schedule the transmission request corresponding to the link.

An example algorithm implemented by the link selection module to determine the set of scheduled transmissions may be as follows.

1. $R_{ord}$ = Ordering ($R_{all}$)
2. $T_{next}$ Θ, MaxThp 0
3. foreach r E $R_{ord}$ do
4.    $T_{tmp}$ $T_{next}$ U {(r, k)}
5.    foreach k E K do
6.       $T_{tmp}$[(r, k')] {(r, k)}

-continued

```
7.      LocalThp apprxthp (Ttmp)
8.      if LocalThp > MaxThp then
9.          MaxThp localThp
10.         T_next T_tmp
11.     end
12.     if r E T_next then R_ord R_ord −ConflictSet(r)
13.     R_ord R_ord − {r}
14. end
```

An input into the above algorithm implemented by the link selection module 234 may be transmission requests stored in one or more queues, in one embodiment. Such transmission requests may be represented by $R_{all}=\{r\}$, where r=(i, j, b), which may represent a transmission request between an access point (AP) i and a client or user device j on traffic direction b. The output of the algorithm may be $T_{next}=\{\{r, k\}\}$, which may be the set of scheduled transmissions and their selected beam directions.

As described, the link selection module 234 may access each transmission request r (as shown in lines 3-14 of the algorithm), one at a time, and may add the transmission request r to the set of next scheduled transmissions ($T_{next}$) if such addition increases the estimated capacity or throughput, as will be described in greater detail below in association with a second algorithm. In one embodiment, the algorithm above may be a greedy algorithm in which each transmission request orientation selects the antenna orientation that may maximize the aggregate throughput without changing the orientation on previously scheduled transmissions, in one embodiment.

Upon determining which beam direction should be used, the scheduling module 232 may send a message to the access point 240 that includes the particular beam direction to use for the communication, among other information. As described above, the access point 240 may include multiple transmit antennas each corresponding to a different beam direction, as well as multiple receive antennas each also corresponding to a different beam direction. The message transmitted to the access point 240 may indicate which of these beam directions should be used for implementing the transmission request. In this way, the message may cause certain actions to be performed by the access point 240, such as causing the access point 240 to use a certain antenna (e.g., an antennas that corresponds to the beam selected by the scheduler module 232) for implementing the transmission request.

To facilitate determination of the set of scheduled transmissions, the link selection module 234 may further remove transmissions requests from the queue of transmission requests after the transmission requests have been analyzed, in one embodiment. According to one example, if a transmission request r has been scheduled for transmission, the set of transmission requests that may not be scheduled with the transmission request r (referred to in the present example as the ConflictSet(r)) may be removed from the list of transmission requests at least for the reason that an already scheduled access point or user device may not be scheduled again in the same traffic direction. Lines 12 and 13 of the above algorithm may capture such functionality.

As mentioned, the algorithm implemented by the link selection module 234 may rely upon a second algorithm implemented by the throughput calculation module 236 to determine whether selected links (e.g., as selected by the link selection module 234) increase throughput of concurrently scheduled links, and hence, should also be scheduled.

An example such algorithm implemented by the throughput calculation module 236 may be as follows.

```
1.  apprxthp β 0
2.  foreach (i_1, j_1, k_1, b_1) E T do
3.      Signal β S(i_1, j_1, k_1, b_1)
4.      Interfβ 0
5.      ConflictSet(i_1, j_1, k_1, b_1) = {(i', j', k', b') ≠ (i_1, j_1, k_1, b_1) E T |
                ∃ edge((i', j', k', b'),(i_1, j_1, k_1, b_1)) in G }
6.      Interf β f(ConflictSet(i_1, j_1, k_1, b_1) )
7.  end
8.      SINR β Signal − Interf
9.      linkthp β Rate (SINR)
10.     apprxthp β apprxthp + linkthp
11. end
12. return apprxthr
```

In one embodiment, the throughput calculation module 236 may calculate the throughput associated with active links, or links that are currently scheduled for transmission. In this way, the throughput calculation module 236 may determine whether interference exists for active communications. In another embodiment, the throughput calculation module 236 may determine whether selected links (e.g., links selected by the link selection module 234) may increase aggregated throughput, and hence, should be scheduled along with one or more other concurrently scheduled communications.

In one embodiment, the set of concurrent transmissions determined by the link selection module 234 may be input into the algorithm implemented by the throughput calculation module 236. Put another way, an input may be the set of concurrent transmissions T={(i, j, k, b), where i is the access point (AP), j is the client or user device, k is the beam direction, and b is the uplink/downlink traffic direction with respect to the AP. Another input may be the signal to interference-plus-noise ratio (SINR). In one embodiment, a rate mapping table may be used to determine a rate or throughput based at least in part on the SINR. Another input may be a conflict graph G, which may represent signal strengths and interference associated with communication links between devices, as described above. Various other inputs may exist in other embodiments. The output of the algorithm implemented by the throughput calculation module 236 may be the throughput approximation apprxthp for T, in one embodiment.

According to one example, the conflict graph may be used to determine the expected throughput given a set of selected links, such as the links selected by the link selection module 234. For each of the selected links, the throughput calculation module 236 may measure the interference that may projected onto the selected link by one or more active links, in one embodiment. Because the conflict graph represents information associated with signal strengths and interference (e.g., obtained by the data collection module 228) for each of the links in the conflict graph, the throughput calculation module 236 may determine the aggregated interference that may result for all links, that is, active links and the set of selected links that are being considered for scheduling, in one embodiment. Put another way, the throughput for each of the selected links may be determined and summed to determine the aggregate throughput.

The aggregated impact of the set of conflicting links may be calculated at the selected or intended link, as shown in line 6. In the present example, f may be a function that calculates the impact of aggregate interference. The impact of aggregate interference may be the highest interference contributing component, or any other combination of the individual interfering components. Link throughput and aggregated throughput values may be calculated based on the estimated SINR values and the SINR-rate mapping table, at lines 8-10.

As shown on line 8 of the algorithm implemented by the throughput calculation module 236 SINR may be determined by subtracting the aggregated interference from the signal strength as provided by the conflict graph. A table may be used to convert the SINR to a rate or throughput as described above. Such a table may associate SINRs with corresponding throughputs. For example, a SINR of 10 dB may correspond to 12 megabits per second (Mbps), whereas a SINR of 20 dB may correspond to 36 Mbps. The example conversion is not meant to be limiting but is illustrative of a conversion that may be used to determine throughputs based on calculated SINR values. Various other techniques may be used to determine throughputs based on SINR values, such as the channel capacity formula, etc.

In the manner described above, both transmission and receive beams may be selected. In configurations in which only one transmit beam and one receive beam may be active at a time, the scheduler module 232 may determine which of multiple transmit beams and multiple receive beams should be scheduled to reduce interference and increase throughput. The throughput calculation module 236 may be used to determine whether such increases in throughput may be obtained if a link selected by the link selection module 234 (or other process) is added to concurrently scheduled or active links. Such increases in throughput may not be realized, for example, if an amount of interference, as represented by the conflict graph, exists or would otherwise be projected onto the selected link by the one or more concurrently scheduled links.

The memory 254 associated with the access point 240 may include various software or program modules, such as the access point (AP) communication module 258. The AP communication module 258 may configure the access point 240 to communicate with the various devices in FIG. 2. For example, the AP communication module 258 may configure the access point 240 to receive information from user devices, such as the user devices 270, and forward the information to the central controller 210, or other devices. The AP communication module 258 may also send information to various devices, such as the user devices 270, other access points 240, and/or the central controller 210 as described. The information received by the AP communication module 258 may be signal strength and interference measurements received by the user devices 270 and neighboring access points 270. As described, the AP communication module 240 may forward such information to the central controller 210, which may analyze the information to determine a selection of links to schedule such that interference on the network 205 is reduced and capacity or throughput is increased.

The user communication module 286 associated with the user device 270 may receive signal strength and interference information from other devices in FIG. 2. The user communication module 286 may also send such information to other devices, such as an access point 240 with which the user device 270 is associated. The user communication module 286 may further access scheduling information associated with times or time frames during which it may transmit information, for example, and send information at such time or within such time frames. The one or more user applications 288 may configure the user device 270 to perform any number or type of functions associated with such applications 288.

The above descriptions in FIG. 2 are for purposes of illustration and are not meant to be limiting. Other descriptions, configurations, examples, etc., may also exist. For example, at least a portion of the functions associated with the central controller 210 may be performed by the access point 240. Also, a conflict graph may not be generated in some embodiments. According to these embodiments, the interference relationship presented in the conflict graph may be stored in a memory or other storage mechanism and utilized to determine which links should be scheduled in view of the concurrently scheduled or active links.

Figure 3A:
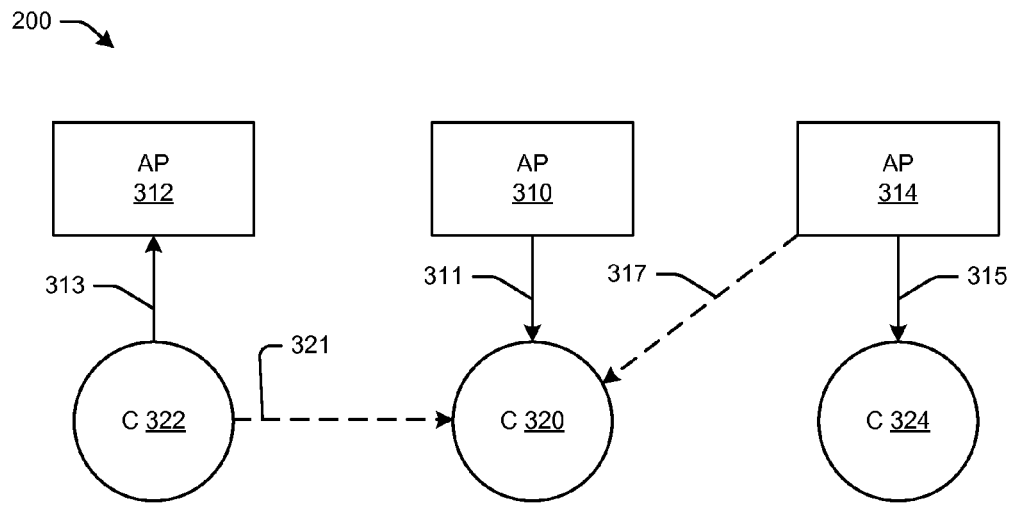
FIGS. 3A and 3B illustrate example network graphs depicting interference relationships between potential communication links, according to an embodiment of the disclosure.
Figure 3B:
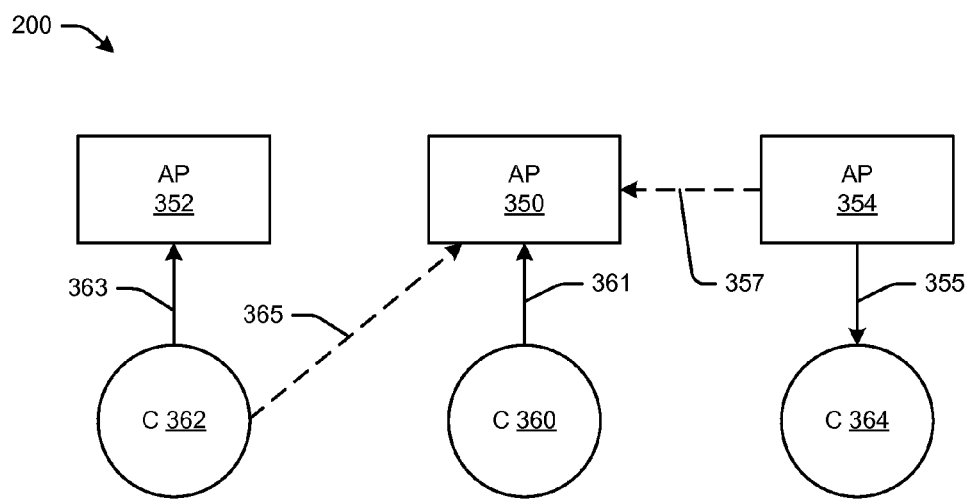

FIGS. 3A and 3B depict example network graphs depicting interference relationships between potential communication links, according to an embodiment of the disclosure. Such network graphs may be used to generate respective conflict graphs that may encode interference relationships and signal strengths between wireless devices. As an example, the network graph in FIG. 3A may be used to generate a conflict graph. As shown, dotted edges 317 and 321 may represent the only interferences that exist in the network in FIG. 3A, in one embodiment. Three nodes corresponding to pairs of access points and user devices, as well as the selected beams for communication between the pairs of devices and a specified traffic direction, are also illustrated. For example, a first node may be access point AP 310 and user device 320, as well as a certain beam used for downloading information from AP 310 to user device C320. The two nodes on either side of the above node (e.g., (1) AP 312 and C322, as well as a certain beam used for uploading information from C322 to AP 312, and (2) AP 314 and C324, as well as a certain beam used for downloading information from AP 314 to C324, as shown) may be connected to the node pair AP 310 to C320 through directional edges. The directional edges may represent interference projected onto the AP 310 to C320 (e.g., the middle link) by the node pairs AP 312 to C322 and AP 314 to C324, in the present example.

The conflict graphs may be used to schedule communication between the wireless devices based on such interference relationships, in certain embodiments herein. As described above, the conflict graphs may be used (e.g., by the throughput calculation module 236) to calculate a capacity or throughput using the interference and signal strengths measured by wireless devices and received by a central controller generating the conflict graphs. The calculated throughput may be used to determine whether a communication link should be scheduled along with one or more other concurrently scheduled or active communication links.

In the examples shown in FIGS. 3A and 3B, nodes in the network graph may represent access points and user devices, while links connecting the nodes may represent communications between the access points and the user devices. An edge, illustrated by dotted lines, may represent interference that may be projected onto beam directions if scheduled along with one or more other concurrently scheduled or active communications indicated by the conflict graph.

Although only one link associated with a single beam direction is shown as connecting nodes in FIGS. 3A and 3B, multiple beam directions corresponding to multiple respective links may exist as potential links over which communication between connected nodes may occur. The signal strength and interference measurements may be associated with each of the different beam directions, in one embodiment. Interference that may potentially be projected onto a particular beam direction may vary based on the beam direction. Such variations may exist by virtue of user devices determining different measurements across the beams upon receiving the burst of frames from an associated access point, in one embodiment. As described, a different antenna for each beam direction (whether a transmit beam or receive beam) may exist at one or more of the access points.

In FIG. 3A, various links associated with requested transmissions are shown. For example, the client or user device C 322 has requested to upload information to AP 312, as indicated by the arrow on the link 313. AP 310 has requested to download information to the user device C320, as indicated by the arrow on the link 311. Further, AP 314 has requested to download information to the user device C324, as indicated by the arrow on the link 315. In the present example, the links 313 and 315 may be concurrently scheduled links. No interference (or increased throughput) may exist when these two links are scheduled in the present example. Upon adding a transmission under consideration, which is the link 311 in the present example, interference from the concurrently scheduled links 313 and 315 may be projected onto the transmission under consideration, as shown by the dotted edges 317 and 321. Put another way, such communication may interfere with each other. A conflict graph generated from the network graph 3A may be leveraged to determine the presence of such interference by virtue of depicting signal strength and interference information collected from the APs 310, 312, and 314, and the user devices 320, 322, and 324, in one embodiment.

Because interference would be projected onto the transmission under consideration 313 (or alternatively because the aggregated throughput would not be increased when the transmission under consideration link 313 is added to the concurrently scheduled links 313 and 315) in the present example, the present beam direction for the transmission under consideration link 313 may not be scheduled. A different beam direction for the transmission under consideration link 313 may be analyzed to determine whether the different beam direction would increase throughput if scheduled along with the concurrently scheduled links 313 and 315. The network graph in FIG. 3A may be updated to illustrate different relationships of projected interference, signals strengths, etc., as each different beam direction is analyzed. Each beam direction for the link 311 may be analyzed in such fashion to determine whether any beam direction for the link 311 may be used for downloading data from the AP 310 to the user device C 320.

In one embodiment, the algorithm implemented by the throughput calculation module 236 may be used to determine whether the throughput is increased when a particular link is added to concurrently scheduled or active communication links. In one embodiment, such a calculation may be performed on active links independent of a link selection process (e.g., as implemented by the link selection module 234). In another embodiment, the throughput calculation may receive links selected by the link selection module 234 (or other process) as inputs into its determination of whether the selected link should be scheduled, for example, in the next available time slot along with one or more other concurrently scheduled links.

The interference between any number of nodes in FIG. 3A may be more generally characterized as S(i, j, k, b), where S is interference associated with a communication between an access point (AP) i and a user device j on beam k in a traffic direction b (e.g., downlink or uplink). As illustrated in FIG. 3A, a potential directional edge 317 to (AP 310, C 320, k1, DL) from (AP 314, C 324, k2, DL) may exist as shown if interference level S(AP 314, C 320, k2, DL) is greater than zero (0), or a predetermined threshold in some embodiments. Put another way, interference (or a non-increase in throughput in one example) may result if beam k1 at the AP 310 is used for download communication with the user device C 320 during the same time slot as beam k2 at the AP 314 is used for download communication with the user device C 324. Such interference may not exist, however, if beam k3 at the AP 310 is used for the download communication, as a non-limiting example.

In one embodiment, the resulting interference for the download communication may be due to a set of interfering transmissions including other download transmissions in which neighboring access points project interference, or upload transmission in which an uplink communication from a user device projects interference. Such interference relationships may also be depicted by the network graph in FIG. 3A by virtue of the conflict graph having access to signal strengths and interference measurements associated with such devices.

As another example, a potential directional edge 321 to (AP 310, C 320, k1, DL) from (AP 312, C 322, k2, UL) may exist as shown if interference level S(C 322, C 220) is greater than zero (0), or a predetermined threshold in some embodiments. Put another way, interference (or a non-increase in throughput in one example) may result if beam k1 at the AP 310 is used for download communication with the user device C 320 during the same time slot (or at the same time or approximately the same time) as beam k2 at the AP 312 is used to receive an upload communication from the user device C 322.

The above descriptions in FIG. 3A are for purposes of illustration and are not meant to be limiting. Other descriptions, configurations, examples, etc., may exist in other examples. For example, any number of nodes, links, and interference edges may exist in other examples.

FIG. 3B is another example network graph that may be used in the same or similar fashion as the network graph 3A. Various links associated with requested transmissions are also shown in FIG. 3A. For example, the client or user device C 362 has requested to upload information to the AP 352, as indicated by the arrow on the link 363. The user device C 360 has requested to upload information to the AP 350, as indicated by the arrow 360 on the link 361. Further, the AP 354 has requested to download information to the user device 364, as indicated by the arrow on the link 355. In the present example, the links 363 and 355 may be concurrently scheduled links. The network graph in FIG. 3B may be used to determine whether interference may be introduced into communications that include adding the link 361, which may be referred to as a transmission under consideration as described above.

The interference relationships between the nodes in FIG. 3B may also be characterized as S(i, j, k, b) as described above. As illustrated in FIG. 3B, a potential directional edge 357 to (AP 350, C 360, k1, UL) from (AP 354, C 364, k2, DL) may exist as shown if interference level S(AP 354, AP 350, k2, k1) is greater than zero (0), or a predetermined threshold in some embodiments. Put another way, interference (or a non-increase in throughput in one example) may result if beam k1 at the AP 350 is used for receiving a communication from the user device C 360 during the same time slot as beam k2 at the AP 354 is used to download communication to the user device C 364. Such interference may not exist, however, if beam k1 at the AP 350 is used for receiving the communication from the user device C 360 and/or beam k3 at the AP 354 is used for download communication with the user device C 364, as a non-limiting example.

As another example, a potential directional edge 365 to (AP 350, C 360, k1, UL) from (AP 352, C 362, k2, UL) as shown if interference level S(AP 350, C 362, k1, UL) is greater than zero (0), or a predetermined threshold in some examples. Put another way, interference (or a non-increase in throughput in one example) may result if beam k1 at the AP 350 is used to receive an upload communication from the user device 360 during the same time slot (or at the same time or approximately the same time) as beam k2 at the AP 352 is used to receive an upload communication from the user device C 362.

The above descriptions in FIG. 3B are for purposes of illustration and are not meant to be limiting. Other descriptions, configurations, examples, etc., may exist in other examples. For example, any number of nodes, links, and interference edges may exist in other examples.

Figure 4:
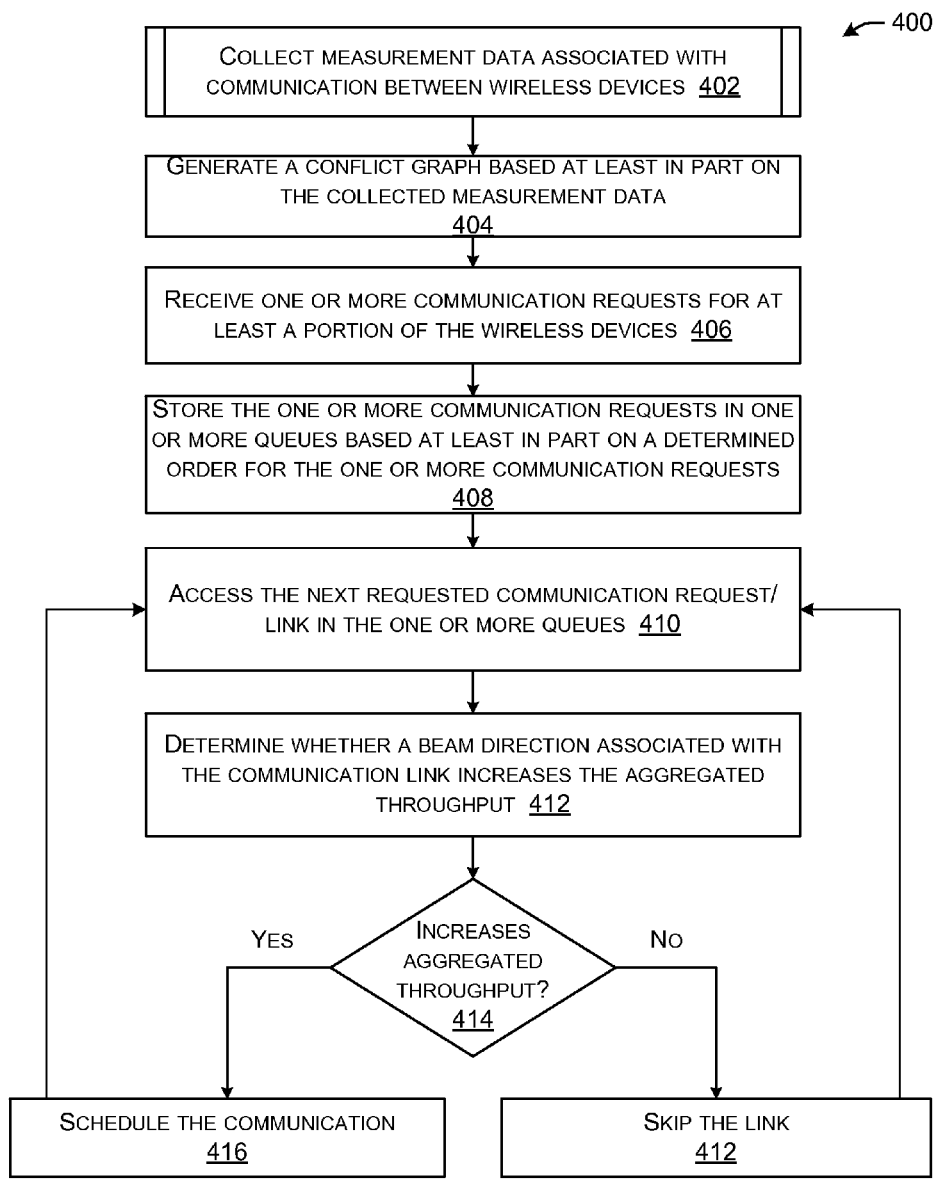
FIG. 4 illustrates a flow diagram of an example process for scheduling communication between wireless devices to reduce interference, according to an embodiment of the disclosure.

FIG. 4 depicts a flow diagram of an example process 400 for scheduling communication between wireless devices to reduce interference, according to an embodiment of the disclosure. The example process 400 may be implemented by the central controller 210 in FIG. 2, in one embodiment. The example process 400 may begin at block 402, where measurement data associated with communication between one or more wireless devices may be collected (e.g., via the data collection module 228). A more detailed description of collecting the measurement data is provided in association with FIG. 5.

A conflict graph may be generated based at least in part on the collected measurement data (e.g., via the conflict graph generation module 230) at block 404. The conflict graph may encode interference relationships between wireless devices that may be used to determine whether a communication link should be scheduled concurrently with one or more other communication links (e.g., as determined by the scheduler module 232).

At block 406, one or more requests for transmission or communication between wireless devices may be received. For example, an access point may request to download information to a user device. As another example, a user device may request to upload information to an access point. Numerous other example communications may exist. An order associated with the received communication requests may be determined (e.g., by the link selection module 234). For example, the communication requests may be stored in one or more queues based on the direction of the transmission (e.g., download or upload), or according to various other criteria, at block 408.

After the communication requests have been ordered, the requests may be accessed based on the order in one embodiment, at block 410. As described above, each communication request may be associated with a communication link, which may correspond to a beam or an antenna that may be used to implement the communication. A suitable beam or antenna for implementing the communication may be determined based on an amount of interference that may result between scheduling the communication request concurrently (e.g., at the same time slot) with one or more other communication requests. A conflict graph may be used as an input by the link selection module 234, as well as the throughput calculation module 236, to determine whether the communication request should be scheduled.

In one embodiment, if the interference that results from scheduling the communication request concurrently with certain other communication requests does not exist, or alternatively is below a threshold or acceptable level, then the communication request may be scheduled. The threshold level may be predetermined. In one embodiment, the threshold level may be predetermined based on a historical level of interference (e.g., acceptable interference). As another example, if the capacity or throughput associated with scheduling the communication request concurrently with other scheduled communication requests (e.g., the aggregated throughput) increases, at block 412, then the communication request may be scheduled at block 416. If the aggregated throughput does not increase, then the link association with the communication request may be skipped, at block 418, and processing may return to block 410 where the next communication request is accessed and analyzed in the manner described above. Similarly, after a communication request is scheduled at block 416, processing may return to block 410 such that the next communication request may be analyzed.

Figure 5:
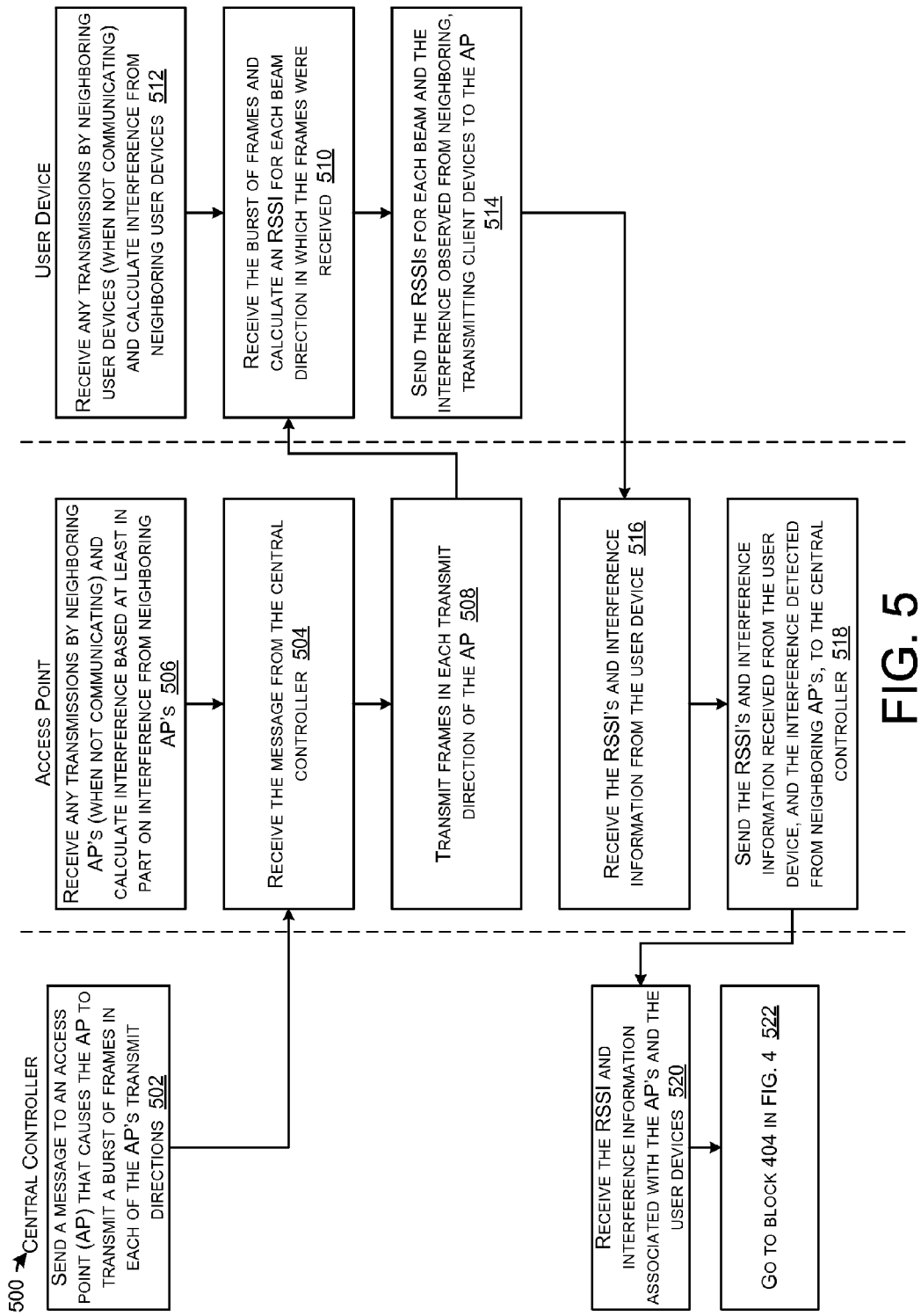
FIG. 5 illustrates a flow diagram of an example process for collecting measurement data between wireless devices to facilitate scheduling communication to reduce interference, according to an embodiment of the disclosure.

FIG. 5 depicts a flow diagram of example processes 402 for collecting measurement data between wireless devices to facilitate scheduling communication to reduce interference, according to an embodiment of the disclosure. The example processes may be implemented by a central controller (e.g., the central controller 210 in FIG. 1), an access point (e.g., the access point 240 in FIG. 2), and a user device (e.g., the user device 270 in FIG. 2), as indicated by the dotted lines separating steps performed by each of these devices.

The example processes may begin at block 502, where a message may be sent (e.g., by the data collection module 228) to one or more access points. The one or more access points may be associated with a central controller that implements the data collection module 228, in one embodiment. The message sent to the one or more access points may include an instruction that causes the access points to scan each of their respective transmit directions and transmit frames in these directions.

The message may be received by the access point (e.g., via the AP communication module 258) at block 504. In response to receiving the message, the access point may transmit a burst of frames in each of its transmit directions at block 508, as described above. In one embodiment, the message may include an indication of one or more particular transmit directions in which to transmit. The indication may be based on historical information determined by the central controller, in one embodiment.

In addition to receiving the message from the central controller that causes transmission of the burst of frames, the access point may also receive interference information associated with communication by neighboring access points at block 506. In one example, the access point may receive such interference information while monitoring or listening for information from the central controller. The neighboring access points may be communicating with one or more other devices during such listening time. One or more of the receive beams associated with the access point may receive the interference information. As described herein, such information may be analyzed by the central controller to determine whether transmission requests by the access point should be scheduled concurrently with other transmission requests.

The burst of frames transmitted in each transmission direction of the access point may be received by a user device (e.g., via the user communication module 286) at block 510. The user device may have a single omnidirectional antenna, in one configuration, while any number and/or types of antennas may exist in other configurations. The user device may record the RSSI readings for the frames and may calculate an interference level experienced by the user device. An RSSI for each beam carrying the frames may be determined. For example, S(i, j, k, b) may be calculated as the mean received RSSI by user device j from access point i on beam k and traffic direction b (e.g., downlink mode).

The user device may also receive interference information associated with neighboring user devices at block 512. In one embodiment, the user device may receive such interference when monitoring or listening for information from an access point with which it is associated. During such time, neighboring user devices may communicate with other devices, and any interference associated with the communication may be received by the user device. The user device may send the RSSIs for each of the beams associated with the access point and the interference observed from neighboring user devices to the access point, at block 514. Such information may be sent sequentially with respect to other user devices, in one embodiment.

The access point may receive the RSSIs and interference information from the user device (e.g., via the AP communication module 258) at block 516. The mean received RSSI for the user device (as well as other user devices associated with the access point) may be measured on each receive beam associated with the access point. As an example, S(i, j, k, b) for all k values and traffic direction b denoting the uplink mode may be measured. The access points may record the RSSI readings on all of their beam patterns and may calculate S(i1, i2, k1, k2) as the mean interference level observed by the access point, for example, access point i1 when it uses beam k1 and when i2 uses beam k2, as a non-limiting example. The remaining user devices may record the RSSI readings and may calculate S(j1, j2) as the mean interference level observed by user device j2 from user device j1, as a non-limiting example.

The access point may send the RSSI and interference information received from the user devices and/or access points to the central controller at block 518. In one embodiment, the mean interference (e.g., the S(i1, i2, k1, k2) described above) may represent interference between the access points, which may be sent to the central controller for construction of the conflict graph and user scheduling. The central controller may therefore receive the interference information at block 520, and may use the information to generate a conflict graph that may be used to schedule transmission requests such that they do not interfere with other communications, and/or such that the aggregated throughput associated with concurrent communications is increased. Processing may thereafter return to block 404 in FIG. 4, as indicated by block 522.

Figure 6:
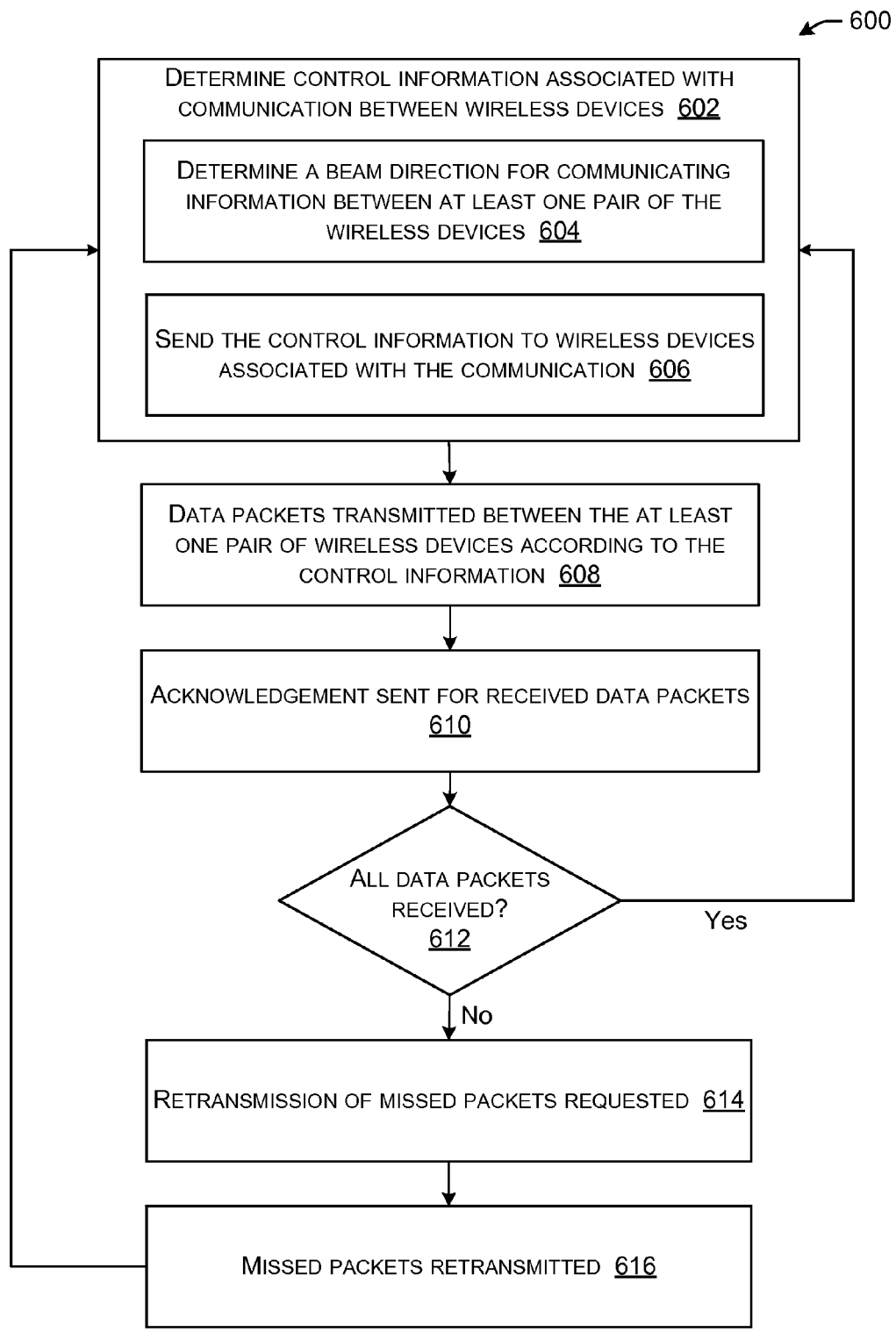
FIG. 6 illustrates a flow diagram of an example process for implementing a Media Access Control (MAC) to facilitate scheduling communications to reduce interference, according to an embodiment of the disclosure.

FIG. 6 depicts an example flow diagram 600 of an example process for implementing a Media Access Control (MAC) to facilitate the processes described herein. The MAC may include three phases, which may include control information phase, the full duplex directional communication phase, and the omni directional communication phase.

The lengths of these phases may be variables which may depend on network load and other system parameters. In one example, the control information exchange may have a duration of 2.0 milliseconds (ms); the data communications phase may have a duration of 20.0 ms; and acknowledgements (ACKs) during the omni directional communication phase may have a duration of 5.0 ms. Any value may be associated with these phases in other examples.

The MAC design may be a TDMA based MAC protocol. According to TDMA, nodes in a multi-cell network, such as central controllers, access points, user devices, etc., may be time synchronized. In one embodiment, time synchronization of user devices may be implemented using beacon messages sent by access points, while access points may be synchronized by the central controller, in various embodiments.

The example flow diagram 600 may begin at block 602, where various control information that may be used for communication between wireless devices (e.g., access points and user devices) may be determined. Such control information may include scheduled times for sequentially sending acknowledgement (ACK) packets by the access points and the user devices. In one embodiment, access points may first be scheduled sequentially, followed by user devices which may be scheduled sequentially after the access points. The control information may also include times at which user devices may begin transmitting uplink communications to one or more access points. In one embodiment, such uplink communications may occur when data transmission begins, which may be determined by the central controller and communicated in the control information.

All or at least a portion of the user devices may be synchronized via the control information such that the client devices know when the data transmission phase begin. The control information may also include an indication of whether a user device may transmit an uplink communication during the data communication phase. If a user device receives an indication that it may transmit during the data transmission phase, then the user device may send uplink communications to the access point during such time. If the user device does not receive an indication that it may transmit an uplink communication during the data transmission phase, then the user device may not transmit during the data communication phase, in one embodiment.

A beam direction between certain access points and user devices may be determined for communication between these devices such that interference may be reduced, as described herein, at block 604. The control information may be sent to the access points and the user devices at block 606. During the control information phase, each access point may notify or announce to a user device that it was selected by the central controller for uplink transmission. Such communication may be referred to herein as an access control announcement and may be managed by the central controller such that access points that interfere with each other may not transmit at the same time. Because the central controller may not send such information directly to the user devices, in one embodiment, the central controller may send the information to an access point, which may forward the information to all or at least a portion of the user devices. The central controller may send the control information directly to the access points.

At block 608, data packets may be transmitted between wireless devices that have been scheduled for communication by the central controller such that interference experienced during the communication does not adversely impact that throughput for all concurrent communications. Such communication may be implemented in 802.11 devices by disabling carrier sensing, raising the CCA threshold to enable communication in presence of interference, and setting the inter frame spacing (IFS) parameter to the minimum value since it may not be needed in a TDMA based MAC. The data packets may be transmitted according to the control information (e.g., at a certain time, among other control information parameters such as those described above).

Wireless devices involved in a communication may send ACKs if they received data packets transmitted to them at block 610. Data packets that were not received, as determined at block 612, may be retransmitted at block 614, in one embodiment. In the omni directional phase, all or at least a portion of the devices on a multi-cell network may compete for channel access. For example, the devices, except for the devices that transmitted in the previous phase, may implement omni directional transmission and follow 802.11 MAC. Such a rule may be established to provide fairness between devices. During this omni directional phase, recipient devices of directional transmissions in the previous phase may send acknowledgement (ACK) packets if they were scheduled only in a single direction (e.g., if the access point transmitted and received from different clients in the first phase. User devices may also inform their associated access points of their current queue length.

As part MAC implementation, each access point may send information to the central controller that includes uplink requests by its associated user devices and downlink requests to different user devices. This information may be sent over the wired Ethernet, in one embodiment. The central controller may collect such information and specify the set of communication links that may occur in the next time slot, for example, using algorithm 800 in FIG. 8, and may send the information to all access points.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks.

As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

According to example embodiments of the disclosure, there may be a device. The device may include a modulator, a demodulator, and at least one processor. The at least one processor may be configured to send, to one or more access points, a respective message may include an instruction that causes the one or more access points to send frames in a plurality of beam directions to one or more user devices. The at least one processor may be configured to receive, from the one or more access points, signal strength and interference measurements associated with the plurality of beam directions. The at least one processor may be configured to generate a conflict graph may include interference relationships between the one or more access points and the one or more user devices, wherein the interference relationships are based at least in part on the received signal strength and interference measurements. The at least one processor may be configured to receive a plurality of transmission requests for scheduling communication between the one or more access points and the one or more user devices. The at least one processor may be configured to schedule, along with one or more previously scheduled transmission requests, a beam direction associated with a transmission request of the plurality of transmission requests, wherein the scheduling is based at least in part on a throughput associated with the beam direction increasing an aggregated throughput of the one or more previously scheduled transmission requests. The at least one processor may also be configured to send a second message to an access point of the one or more access points associated with the transmission request, wherein the second message causes the access point to perform the transmission request with a user device of the one or more user devices at a time indicated in the message.

The beam direction may include a first beam direction, and wherein the transmission request includes requests to simultaneously (i) download information from the access point to the user device in the beam direction and (ii) receive information from the user device to the access point in a second beam direction. The transmission request may include a request to download information from the access point to the user device. The transmission request may include a request to upload information form the user device to the access point. The beam direction may include a first beam direction, and the at least one processor may also be configured to determine that a second beam direction associated with the transmission request should not be scheduled based at least in part on a throughput associated with the second beam direction not increasing the aggregated throughput. The interference projected onto the beam direction associated with the transmission request may be less than a threshold level. The conflict graph indicates that an amount of interference projected onto a beam direction that is not scheduled may be greater than a threshold level of interference. The at least one processor may also be configured to determine an order associated with the plurality of transmission requests, and accessing the plurality of transmission requests in the determined order to determine whether to schedule the plurality of transmission request with the previously scheduled transmission requests. The plurality of beam directions may correspond to a plurality of respective antennas associated with the access point. At least a portion of the interference measurements may be associated with (i) at least one neighboring access point of the one or more access points and (ii) at least one neighboring user device of the one or more user devices.

According to some embodiments of the disclosure, there may be a method. The method may include sending, by a central controller including at least one processor, to one or more access points, a respective message including an instruction that causes the one or more access points to send frames in a plurality of beam directions to one or more user devices. The method may include receiving, by the central controller from the one or more access points, signal strength and interference measurements associated with the plurality of beam directions. The method may include generating, by the central controller, a conflict graph including interference relationships between the one or more access points and the one or more user devices, the interference relationships based at least in part on the received signal strength and interference measurements. The method may include scheduling, by the central controller, a beam direction associated with a transmission request, along with one or more previously scheduled transmission requests, based at least in part on the conflict graph. The method may also include receiving, by the central controller, a plurality of transmission requests for scheduling communication between the one or more access points and the one or more user devices. The method may include sending, by the central controller, a second message to an access point of the one or more access points associated with the transmission request, wherein the second message causes the access point to perform the transmission request with a user device of the one or more user devices at a time indicated in the message.

The beam direction may include a first beam direction, and wherein the transmission request may include requests to simultaneously (i) download information from the access point to the user device in the beam direction and (ii) receive information from the user device to the access point in a second beam direction. The beam direction may include a first beam direction, and wherein the method may further include determining, by the central controller, that a second beam direction associated with the transmission request should not be scheduled based at least in part on a throughput associated with the second beam direction not increasing the aggregated throughput. The conflict graph may indicate that an amount of interference projected onto a beam direction that is not scheduled is greater than a threshold level of interference.

According to some embodiments of the disclosure, there may be a system. The system may include a plurality of antennas, a radio, and at least one processor. The at least one processor may be configured to send, to one or more access points, a respective message may include an instruction that causes the one or more access points to send frames in a plurality of respective beam directions to one or more user devices, the plurality of respective beams directions associate with the plurality of antennas. The at least one processor may be configured to receive, from the one or more access points, signal strength and interference measurements associated with the plurality of beam directions. The at least one processor may be configured to generate a conflict graph including interference relationships between the one or more access points and the one or more user devices, the interference relationships based at least in part on the received signal strength and interference measurements. The at least one processor may be configured to schedule a beam direction associated with a transmission request, along with one or more previously scheduled transmission requests, based at least in part on the conflict graph.

The plurality of antennas may include at least one transmit antenna and at least one receive antenna. The at least one transmit antenna may send information associated with the transmission request. The at least one receive antenna may receive information associated with the transmission request. The message may include a first message, and wherein the at least one processor may be further configured to send a second message to an access point of the one or more access points associated with the transmission request, wherein the second message may cause the access point to perform the transmission request with a user device of the one or more user devices at a time indicated in the message. The beam direction may include a first beam direction, and wherein the transmission request may include requests to simultaneously (i) download information from the access point to the user device in the beam direction and (ii) receive information from the user device to the access point in a second beam direction. The transmission request may include a request to download information from the access point to a user device using a transmit antenna of the plurality of antennas, the transmit antenna oriented in the beam direction. The transmission request may include a request to upload information from the user device to the access point using a receive antenna of the plurality of antennas, the receive antenna oriented in the beam direction. Performing the transmission request may include the access point receiving information from the user device in the beam direction. The beam direction may include a first beam direction, and wherein the at least one processor is further configured to determine that a second beam direction associated with the transmission request should not be scheduled based at least in part on a throughput associated with the second beam direction not increasing the aggregated throughput.

In another example embodiment, there is disclosed one or more non-transitory computer-readable media storing computer-executable instructions. The one or more computer-readable media may store computer-executable instructions that, when executed by one or more processors, configure the one or more processors to perform operations. The operations may include sending, to one or more access points, a respective message including an instruction that causes the one or more access points to send frames in a plurality of beam directions to one or more user devices. The operations may include receiving, from the one or more access points, signal strength and interference measurements associated with the plurality of beam directions. The operations may include generating a conflict graph including interference relationships between the one or more access points and the one or more user devices, wherein the interference relationships are based at least in part on the received signal strength and interference measurements. The operations may include receiving a plurality of transmission requests for scheduling communication between the one or more access points and the one or more user devices. The operations may include scheduling, along with one or more previously scheduled transmission requests, a beam direction associated with a transmission request of the plurality of transmission requests, wherein the scheduling is based at least in part on a throughput associated with the beam direction increasing an aggregated throughput of the one or more previously scheduled transmission requests. The message may include a first message, and wherein the at least one processor is further configured to execute the computer-executable instructions to perform the operations which may include sending a second message to an access point of the one or more access points associated with the transmission request, wherein the second message causes the access point to perform the transmission request with a user device of the one or more user devices at a time indicated in the message.

The beam direction may include a first beam direction, and wherein the transmission request may include requests to simultaneously (i) download information from the access point to the user device in the beam direction and (ii) receive information from the user device to the access point in a second beam direction. The transmission request may include a request to download information from the access point to the user device. The transmission request may include a request to upload information form the user device to the access point. The beam direction may include a first beam direction, and wherein the at least one processor is further configured to execute the computer-executable instructions to perform the operation which may include determining that a second beam direction associated with the transmission request should not be scheduled based at least in part on a throughput associated with the second beam direction not increasing the aggregated throughput. Interference projected onto the beam direction associated with the transmission request may be less than a threshold level. The conflict graph may indicate that an amount of interference projected onto a beam direction that is not scheduled may be greater than a threshold level of interference. The at least one processor may be further configured to execute the computer-executable instructions to perform the operation including determining an order associated with the plurality of transmission requests, and accessing the plurality of transmission requests in the determined order to determine whether to schedule the plurality of transmission request with the previously scheduled transmission requests. The plurality of beam directions may correspond to a plurality of respective antennas associated with the access point. At least a portion of the interference measurements may be associated with (i) at least one neighboring access point of the one or more access points and (ii) at least one neighboring user device of the one or more user devices.

In example embodiments of the disclosure, there may be a device. The device may include a modulator and a demodulator. The device may include means for sending, to one or more access points, a respective message including an instruction that causes the one or more access points to send frames in a plurality of beam directions to one or more user devices. The device may include means for receiving, from the one or more access points, signal strength and interference measurements associated with the plurality of beam directions. The device may include means for generating a conflict graph including interference relationships between the one or more access points and the one or more user devices, wherein the interference relationships are based at least in part on the received signal strength and interference measurements. The device may include means for receiving a plurality of transmission requests for scheduling communication between the one or more access points and the one or more user devices. The device may include means for scheduling, along with one or more previously scheduled transmission requests, a beam direction associated with a transmission request of the plurality of transmission requests, wherein the scheduling is based at least in part on a throughput associated with the beam direction increasing an aggregated throughput of the one or more previously scheduled transmission requests. The device may further include means for sending a second message to an access point of the one or more access points associated with the transmission request, wherein the second message causes the access point to perform the transmission request with a user device of the one or more user devices at a time indicated in the message. The beam direction may include a first beam direction, and wherein the transmission request may include requests to simultaneously (i) download information from the access point to the user device in the beam direction and (ii) receive information from the user device to the access point in a second beam direction. The transmission request may include a request to download information from the access point to the user device. The transmission request may include a request to upload information form the user device to the access point.

The beam direction may include a first beam direction, and the device may further include means for determining that a second beam direction associated with the transmission request should not be scheduled based at least in part on a throughput associated with the second beam direction not increasing the aggregated throughput. Interference projected onto the beam direction associated with the transmission request may be less than a threshold level. The conflict graph indicates that an amount of interference projected onto a beam direction that is not scheduled may be greater than a threshold level of interference. The device may further include means for determining an order associated with the plurality of transmission requests, and means for accessing the plurality of transmission requests in the determined order to determine whether to schedule the plurality of transmission request with the previously scheduled transmission requests. The plurality of beam directions may correspond to a plurality of respective antennas associated with the access point. At least a portion of the interference measurements are associated with (i) at least one neighboring access point of the one or more access points and (ii) at least one neighboring user device of the one or more user devices.

In example embodiments of the disclosure, there may be an apparatus. The apparatus may include a plurality of antennas, and a radio. The apparatus may include means for sending, to one or more access points, a respective message including an instruction that causes the one or more access points to send frames in a plurality of respective beam directions to one or more user devices, the plurality of respective beams directions associate with the plurality of antennas. The apparatus may include means for receiving, from the one or more access points, signal strength and interference measurements associated with the plurality of beam directions. The apparatus may include means for generating a conflict graph including interference relationships between the one or more access points and the one or more user devices, the interference relationships based at least in part on the received signal strength and interference measurements. The apparatus may include means for scheduling a beam direction associated with a transmission request, along with one or more previously scheduled transmission requests, based at least in part on the conflict graph. The plurality of antennas may include at least one transmit antenna and at least one receive antenna. The message may include a first message, and may further include means for sending a second message to an access point of the one or more access points associated with the transmission request, wherein the second message causes the access point to perform the transmission request with a user device of the one or more user devices at a time indicated in the message.

The beam direction may include a first beam direction, and wherein the transmission request may include requests to simultaneously (i) download information from the access point to the user device in the beam direction and (ii) receive information from the user device to the access point in a second beam direction. The transmission request may include a request to download information from the access point to a user device using a transmit antenna of the plurality of antennas, the transmit antenna oriented in the beam direction. The transmission request may include a request to upload information from the user device to the access point using a receive antenna of the plurality of antennas, the receive antenna may be oriented in the beam direction. Performing the transmission request may include the access point receiving information from the user device in the beam direction. The beam direction may include a first beam direction, and may further include means for determining that a second beam direction associated with the transmission request should not be scheduled based at least in part on a throughput associated with the second beam direction not increasing the aggregated throughput.

In another example embodiment, there is disclosed one or more non-transitory computer-readable media storing computer-executable instructions. The one or more computer-readable media may store computer-executable instructions that, when executed by one or more processors, configure the one or more processors to perform operations. The operations may include sending, to one or more access points, a respective message including an instruction that causes the one or more access points to send frames in a plurality of respective beam directions to one or more user devices, the plurality of respective beams directions associate with the plurality of antennas. The operations may include receiving, from the one or more access points, signal strength and interference measurements associated with the plurality of beam directions. The operations may include generating a conflict graph including interference relationships between the one or more access points and the one or more user devices, the interference relationships based at least in part on the received signal strength and interference measurements. The operations may include scheduling a beam direction associated with a transmission request, along with one or more previously scheduled transmission requests, based at least in part on the conflict graph. The plurality of antennas may include at least one transmit antenna and at least one receive antenna. The message may include a first message, and wherein the at least one processor may be further configured to execute the computer-executable instructions to perform the operation including sending a second message to an access point of the one or more access points associated with the transmission request, wherein the second message causes the access point to perform the transmission request with a user device of the one or more user devices at a time indicated in the message.

The beam direction may include a first beam direction, and wherein the transmission request may include requests to simultaneously (i) download information from the access point to the user device in the beam direction and (ii) receive information from the user device to the access point in a second beam direction. The transmission request may include a request to download information from the access point to a user device using a transmit antenna of the plurality of antennas, the transmit antenna oriented in the beam direction. The transmission request may include a request to upload information from the user device to the access point using a receive antenna of the plurality of antennas, the receive antenna oriented in the beam direction. Performing the transmission request may include the access point receiving information from the user device in the beam direction. The beam direction may include a first beam direction, and wherein the at least one processor may be further configured to execute the computer-executable instructions to perform the operation including determining that a second beam direction associated with the transmission request should not be scheduled based at least in part on a throughput associated with the second beam direction not increasing the aggregated throughput.

What is claimed is:

1. A device comprising:
   at least one processor, wherein the at least one processor is configured to:
   send, to one or more access points, a respective message comprising a first message and an instruction that causes the one or more access points to send frames in a plurality of beam directions to one or more user devices;
   receive, from the one or more access points, signal strength and interference measurements associated with the plurality of beam directions;
   generate a conflict graph comprising interference relationships between the one or more access points and the one or more user devices, wherein the interference relationships are based at least in part on the received signal strength and interference measurements;
   receive a plurality of transmission requests for scheduling communication between the one or more access points and the one or more user devices;
   schedule, along with one or more previously scheduled transmission requests, a beam direction associated with a transmission request of the plurality of transmission requests, wherein the scheduling is based at least in part on a throughput associated with the beam direction increasing an aggregated throughput of the one or more previously scheduled transmission requests; and
   send a second message to an access point of the one or more access points associated with the transmission request, wherein the second message causes the access point to perform the transmission request with a user device of the one or more user devices at a time indicated in the message.

2. The device of claim 1, wherein the beam direction comprises a first beam direction, and wherein the transmission request comprises requests to simultaneously (i) download information from the access point to the user device in the beam direction and (ii) receive information from the user device to the access point in a second beam direction.

3. The device of claim 1, wherein the transmission request comprises a request to download information from the access point to the user device.

4. The device of claim 1, wherein the transmission request comprises a request to upload information form the user device to the access point.

5. The device of claim 1, wherein the beam direction comprises a first beam direction, and wherein the at least one processor is further configured to: determine that a second beam direction associated with the transmission request should not be scheduled based at least in part on a throughput associated with the second beam direction not increasing the aggregated throughput.

6. The device of claim 1, wherein interference projected onto the beam direction associated with the transmission request is less than a threshold level.

7. The device of claim 1, wherein the conflict graph indicates that an amount of interference projected onto a beam direction that is not scheduled is greater than a threshold level of interference.

8. The device of claim 1, wherein the at least one processor is further configured to:
   determine an order associated with the plurality of transmission requests; and
   accessing the plurality of transmission requests in the determined order to determine whether to schedule the plurality of transmission request with the previously scheduled transmission requests.

9. The device of claim 1, wherein the plurality of beam directions correspond to a plurality of respective antennas associated with the access point, the device further comprising a modulator for modulating one or more signals comprising the data in the plurality of beam directions.

10. The device of claim 1, wherein at least a portion of the interference measurements are associated with (i) at least one neighboring access point of the one or more access points and (ii) at least one neighboring user device of the one or more user devices.

11. A method comprising:
   sending, by a central controller comprising at least one processor, to one or more access points, a respective message comprising a first message and an instruction that causes the one or more access points to send frames in a plurality of beam directions to one or more user devices;
   receiving, by the central controller from the one or more access points, signal strength and interference measurements associated with the plurality of beam directions;
   generating, by the central controller, a conflict graph comprising interference relationships between the one or more access points and the one or more user devices, the interference relationships based at least in part on the received signal strength and interference measurements;
   scheduling, by the central controller, a beam direction associated with a transmission request, along with one or more previously scheduled transmission requests, based at least in part on the conflict graph; and
   sending, by the central controller, a second message to an access point of the one or more access points associated with the transmission request, wherein the second message causes the access point to perform the transmission request with a user device of the one or more user devices at a time indicated in the message.

12. The method of claim 11, further comprising:
   receiving, by the central controller, a plurality of transmission requests for scheduling communication between the one or more access points and the one or more user devices.

13. The method of claim 11, wherein the beam direction comprises a first beam direction, and wherein the transmission request comprises requests to simultaneously (i) download information from the access point to the user device in the beam direction and (ii) receive information from the user device to the access point in a second beam direction.

14. The method of claim 11, wherein the beam direction comprises a first beam direction, and wherein the method further comprises:
   determining, by the central controller, that a second beam direction associated with the transmission request should not be scheduled based at least in part on a throughput associated with the second beam direction not increasing the aggregated throughput.

15. The method of claim 11, wherein the conflict graph indicates that an amount of interference projected onto a beam direction that is not scheduled is greater than a threshold level of interference.

16. A system comprising:
   at least one memory comprising computer-executable instructions; and
   at least one processor, wherein the processor is configured to execute the computer-executable instructions to:
     send, to one or more access points, a respective message comprising a first message and an instruction that causes the one or more access points to send frames in a plurality of respective beam directions to one or more user devices, the plurality of respective beams directions associated with a plurality of antennas;
     receive, from the one or more access points, signal strength and interference measurements associated with the plurality of beam directions;
     generate a conflict graph comprising interference relationships between the one or more access points and the one or more user devices, the interference relationships based at least in part on the received signal strength and interference measurements; and
     schedule a beam direction associated with a transmission request, along with one or more previously scheduled transmission requests, based at least in part on the conflict graph; and
     send a second message to an access point of the one or more access points associated with the transmission request, wherein the second message causes the access point to perform the transmission request with a user device of the one or more user devices at a time indicated in the message.

17. The system of claim 16, further comprising a plurality of antennas, the plurality of antennas comprising at least one transmit antenna for sending information associated with the transmission request, and at least one receive antenna for receiving information associated with the transmission request.

18. The system of claim 16, wherein the beam direction comprises a first beam direction, and wherein the transmission request comprises requests to simultaneously (i) download information from the access point to the user device in the beam direction and (ii) receive information from the user device to the access point in a second beam direction.

19. The system of claim 16, wherein the transmission request comprises a request to download information from the access point to a user device using a transmit antenna of the plurality of antennas, the transmit antenna oriented in the beam direction.

20. The system of claim 16, wherein the transmission request comprises a request to upload information from the user device to the access point using a receive antenna of the plurality of antennas, the receive antenna oriented in the beam direction.

21. The system of claim 16, wherein performing the transmission request comprises the access point receiving information from the user device in the beam direction.

22. The system of claim 16, wherein the beam direction comprises a first beam direction, and wherein the at least one processor is further configured to:
    determine that a second beam direction associated with the transmission request should not be scheduled based at least in part on a throughput associated with the second beam direction not increasing the aggregated throughput.

\* \* \* \* \*